June 3, 1930.  W. F. BROWN  1,761,770
PROCESS FOR PRODUCING LAMINATED GLASS
Filed Jan. 21, 1928
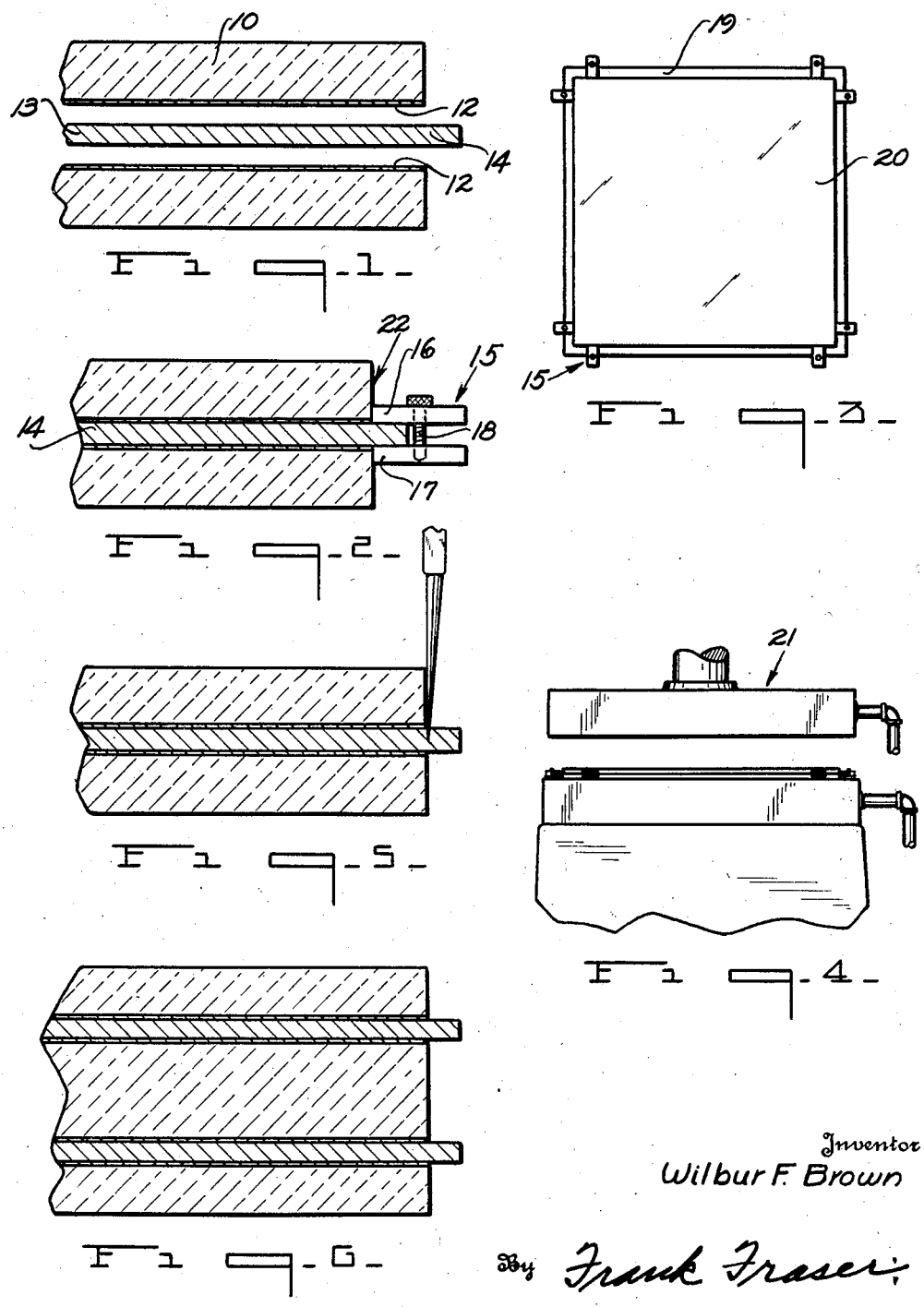
Inventor
Wilbur F. Brown
By Frank Fraser
Attorney Patented June 3, 1930

1,761,770

UNITED STATES PATENT OFFICE

WILBUR F. BROWN, OF TOLEDO, OHIO, ASSIGNOR TO LIBBEY-OWENS GLASS COMPANY, OF TOLEDO, OHIO, A CORPORATION OF OHIO

PROCESS FOR PRODUCING LAMINATED GLASS

Application filed January 21, 1928. Serial No. 248,386.

The present invention relates to laminated glass and to a process and apparatus for producing the same.

An important object of the invention is to provide an improved process and apparatus for producing laminated glass wherein the non-brittle sheet of material to be united to the glass sheets is held against slippage during the uniting operation.

Another object of the invention is to provide a process and apparatus for producing laminated glass wherein a sheet of non-brittle material is united to two sheets of glass and the process contemplates the making of the laminated sheet over sized with respect to the sheets of glass so that a suitable clamping means may be associated with the non-brittle sheet during the uniting of the laminations to prevent slippage of the non-brittle sheets with respect to the glass sheets.

A further object of the invention is to provide such a process and apparatus including clamping means adapted for engagement with the non-brittle sheet during the pressing of the laminations together, said clamping means being so constructed and so mounted that the laminations may be pressed together in a suitable press and the clamping means will not interfere with the uniting of the laminations but will prevent relative movement therebetween.

Other objects and advantages of the invention will become more apparent during the course of the following description when taken in connection with the accompanying drawings.

In the drawings forming a part of this application and wherein like numerals are employed to designate like parts throughout the same.

Fig. 1 is a sectional view illustrating diagrammatically the laminations before they have been placed in contact with each other.

Fig. 2 illustrates the laminations arranged in contact with each other and show the clamping means in operative position.

Fig. 3 is a top plan view of the laminations with the clamping means in operative position.

Fig. 4 is a diagrammatic representation of a pressing means.

Fig. 5 illustrates the laminations after they have been united and the trimming of the non-brittle sheet, and Fig. 6 is a fragmentary sectional view showing a slightly modified form of construction.

In the production of laminated glass it is customary to unite two or more sheets of glass with one or more sheets of non-brittle material. Ordinarily some form of solvent, cement or other bonding medium is used to get the necessary union between the glass sheets and the non-brittle sheet. Due to the nature of the solvent, cement or the like there is a tendency for the laminations to move with respect to each other during the pressing operation. Slippage between the laminations is of course not desirable and it is therefore an aim of the present invention to provide means to prevent slippage between the laminations during the joining thereof.

It is to be understood that this invention is not limited or restricted to any particular method of joining the sheets as regards the binding mediums used. As an example of a process in Fig. 1 is illustrated two sheets of glass 10 and 11 respectively, each of which sheets is provided with a skin or coating 12 of some suitable material such as cellulose composition material. This coating may be formed by spraying, dipping or otherwise applying a cellulose solution on said sheets of glass and then after which the coating thus produced is allowed to dry to the desired extent to remove at least some of the solvent. In some instances, a skin of gelatin coating is formed on a sheet of glass and then again in accordance with some processes no skin at all is formed on the glass sheets.

The numeral 13 designates a sheet of non-brittle material such as cellulose composition material and as shown the end 14 of this sheet extends beyond the ends or edges of the glass sheets 10 and 11. It is also preferred that the non-brittle sheet be larger than the glass sheets so that the sides or ends of the non-brittle sheet will extend beyond all of the sides or edges of the glass sheets.

As shown in Fig. 2 a clamp designated in its entirety by the numeral 15 is associated with the overhanging edge of non-brittle sheet 14, the clamp may comprise a pair of jaws 16 and 17 operable toward and away from each other by means of a threaded nut or the like 18. The size of the jaws and the nut 18 is such that the clamp 15 may be arranged on the non-brittle sheet and yet permit the assembled sandwich to be arranged in a press. The size of the clamp of course will be dependent upon the thickness of the sandwich formed by the superimposing of the sheets of glass and the sheet of non-brittle material. As shown in the plan view in Fig. 3 a number of clamps 15 are used in a single sandwich, however, this invention is not limited to the number of clamps used during the operation.

In assembling the laminations prior to their being united the non-brittle sheet is cut to a sufficiently large size to permit the area 19 shown in Fig. 3 to be present preferably around the entire glass sheet 20 so that in this way the clamps 15 may be arranged around the sandwich. After the sandwich has been formed, it together with the clamps, may be arranged in the press 21 and sufficient pressure and heat applied to obtain a bond between the laminations. Due to the fact that the clamping means are arranged on the non-brittle sheet 14 in a manner that the clamp not only engages the sheet 14 but also abut the ends 22 of the glass sheets, it will be seen that there can be no relative movement between the laminations comprising the sandwich and by preventing this relative movement of slippage it is much easier to produce satisfactory sheets of laminated glass.

After the sheet is taken from the pressing means and the clamps removed, a knife or other similar means 23 may be used to trim the edges of the non-brittle sheet and this may be readily accomplished. In Fig. 6 is illustrated a so-called "bullet-proof" type of glass and in this case both of the non-brittle sheets are such that the clamping means 15 may be used during the uniting or pressing operation.

It will be seen that the clamps are so designed that they can be used while the sheet is in the press without interfering with the pressing of the glass. In other words, there is sufficient clearance both above and below the clamps when they are in operative position to allow the press to be used as is ordinarily done.

I claim:—

The process of producing laminated glass, consisting in assembling the laminations, including a non-brittle lamination, to be joined in proper superimposed relation, the non-brittle lamination being of a size greater than the other laminations, then placing clamping means on the non-brittle lamination on that part thereof extending beyond the other laminations, and arranging the clamping means in abutting association with the edges of the other laminations whereby to prevent relative movement between the various laminations.

Signed at Toledo, in the county of Lucas and State of Ohio, this 19th day of January, 1928.

WILBUR F. BROWN.